Figure 6:
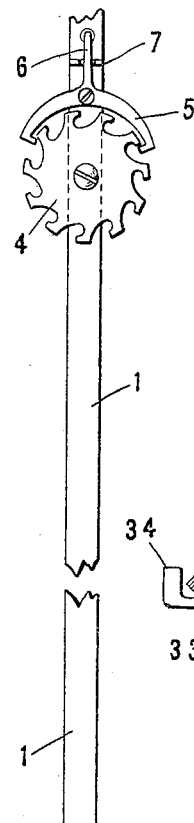

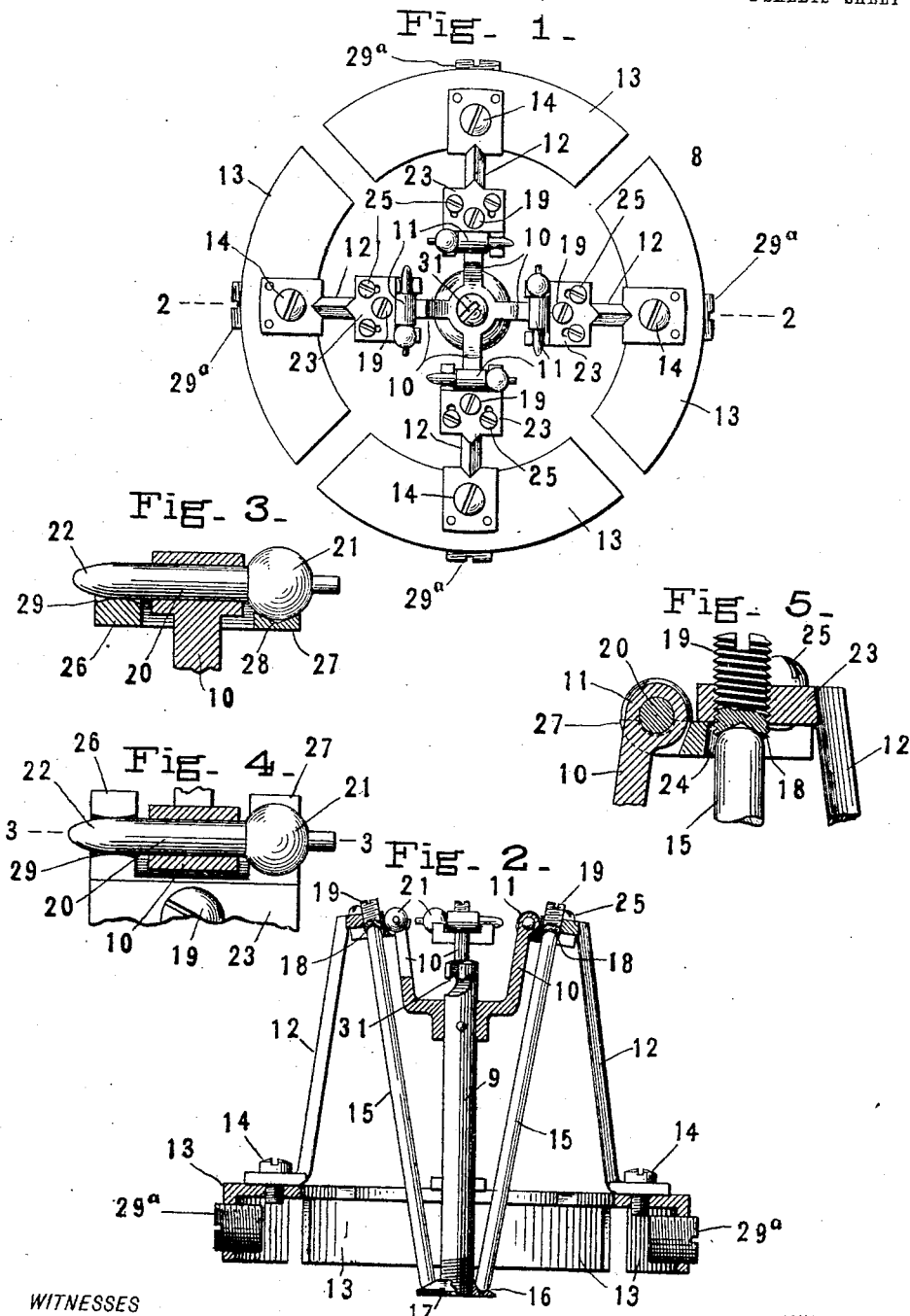

F. ECAUBERT.
COMPENSATING ESCAPEMENT REGULATOR.
APPLICATION FILED NOV. 4, 1907.

965,504.

Patented July 26, 1910.

2 SHEETS—SHEET 2.

WITNESSES
J. Clyde Ripley.
R. L. Stillson.

INVENTOR
Frederic Ecaubert.
BY
Axel V. Beeken
ATTORNEY

UNITED STATES PATENT OFFICE.

FREDERIC ECAUBERT, OF NEW YORK, N. Y.

COMPENSATING ESCAPEMENT-REGULATOR.

965,504.  Specification of Letters Patent.  Patented July 26, 1910.

Application filed November 4, 1907. Serial No. 400,501.

*To all whom it may concern:*

Be it known that I, FREDERIC ECAUBERT, a citizen of the United States of America, and a resident of the borough of Brooklyn, county of Kings, city of New York, State of New York, have invented certain new and useful Improvements in Compensating Escapement-Regulators, of which the following is a specification.

The present invention relates generally to compensating escapement regulators, and has more particularly, though not exclusively, reference to the type of time piece commonly known as "four-hundred day clocks". In clocks of this character an impelling spring is suspended in a vertical plane and is given a torsional motion by the escapement. Upon the end of this impelling spring is suspended a balance wheel or weight which oscillates in a horizontal plane around a vertical axis. The torsion of the spring takes place between the point where it is clamped to a stationary bracket and the point where it is held by the balance wheel or weight. It is obvious that if the effective torsional length of the spring is varied by temperature or otherwise the clock will run slower or faster. It is also evident that the radial expansion or contraction of the balance wheel or weight will vary the speed of the timepiece. Under variations in temperature both the length of the spring and the radius of the balance wheel vary. This variation has been found by actual test to amount to as much as five minutes in twenty-four hours with a difference of twenty degrees in temperature. It will be understood that this variation can be compensated for by automatically shortening or lengthening the effective torsional length of the spring, by increasing or diminishing the radius or effective load of the balance wheel, or by both. In the present instance it is preferred to automatically vary the effective load of the balance wheel.

Accordingly the invention consists in an escapement regulator of the type in which the weight or balance wheel is suspended vertically on a torsional spring, of two members having unequal co-efficients of expansion, and a lever pivotally connected to the said two members adapted to be moved by the difference in expansion of the two members to compensate for temperature induced variations in the effective torsional length of spring and variations in the size of the weight.

The said balance wheel or weight will preferably consist of two members having unequal co-efficients of expansion and a weight carrying lever, pivotally connected to the said members, carrying a compensating weight. Since the balance wheel, in this instance, has to compensate both for its own radial variation and for the lengthwise variation of the spring, the load of the weight must be greater than the weight of the remainder of the escapement regulator. This may be effected either by an actually heavier weight, or by increasing the leverage of the weight carrying lever, or by both. In the present instance, both expedients are resorted to. In the particular form here followed, the members of the balance wheel are arranged substantially vertical, so that their difference in vertical expansion or contraction causes the weight carrying levers to shift the weight radially toward or away from the vertical center of oscillation so as to compensate for the lengthwise variation in the size of the spring and the radial variation in size of the balance wheel. In the particular and preferred form here disclosed, the weight carrying lever is pivoted to the active member, that is, the member having a relatively high co-efficient of expansion, and the passive member, that is, the member having the relatively low co-efficient of expansion, is loosely interposed between the two and held against the active member under compression by the weight carrying lever for which latter it forms a pivotal support. To effect this a spring pressure may be utilized to hold the weight carrying lever against the passive member, or, as herein shown, the weight of the levers may be utilized for this purpose.

In order to prevent the passive member from falling out of place when handling the parts, or otherwise, means are provided for preventing a movement of the weight carrying lever out of its bearing on the passive member.

Other features of construction will appear as the specification proceeds.

In the accompanying drawings the invention is embodied in a concrete and preferred form, but changes of construction may of course be made without departing from the legitimate and intended scope of the invention.

Figure 7:
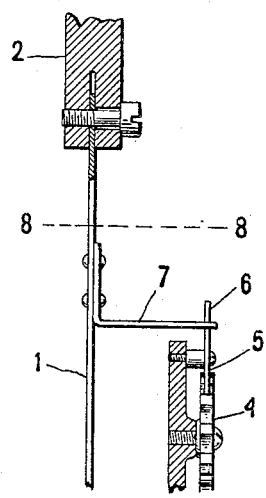
Figure 9:
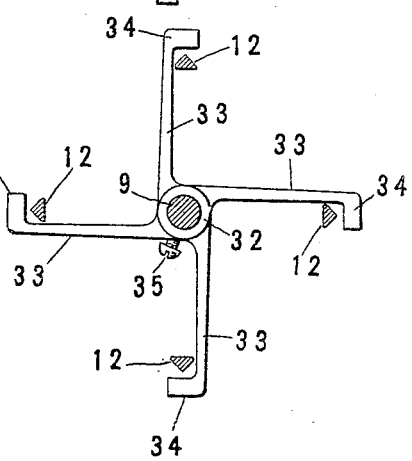
Figure 8:
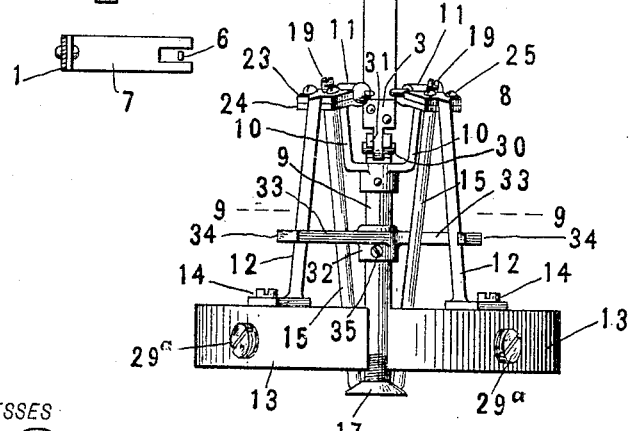

In the said drawings:—Figure 1 is a plan view of the balance wheel proper. Fig. 2 is a vertical sectional view on the line 2—2 of Fig. 1, partly broken away. Fig. 3 is a detail view of one of the pivots of the weight carrying lever in vertical section on the line 3—3 of Fig. 4. Fig. 4 is an enlarged plan view of said pivot partly in section. Fig. 5 is an enlarged detail view in section of the parts shown in the upper right hand corner of Fig. 2. Fig. 6 is a general view showing the balance wheel proper suspended on the impelling spring. Fig. 7 is a detail view in section of the bracket supporting the spring and the means for impelling the same. Fig. 8 is a detail view on the section line 8—8 of Fig. 7. Fig. 9 is a transverse horizontal section on the line 9—9 of Fig. 6, with parts omitted.

Similar characters of reference indicate corresponding parts in the several views.

1 indicates an impelling spring suspended in a vertical plane by being clamped in the bracket 2. At its lower end this spring is clamped by a block 3. The effective torsional length of the spring is therefore the distance between the bracket 2 and the block 3. 4 denotes an escapement wheel in engagement with the anchor 5, which latter carries a pallet 6 which acts alternately upon the arms 7 secured to the spring. These parts operate in the usual manner. The weight or balance wheel proper, 8, in this instance, is composed of the post 9 provided with four arms 10. These parts are preferably made of brass or phosphor bronze and constitute the active member.

Pivotally connected by means of the pivots 11 are a plurality of weight carrying levers 12 having each at their free ends the compensating weight 13 attached thereto by means of the screws 14 or otherwise.

15 indicates the passive member, preferably a bar or tube of glass, or other suitable material. The passive member is loosely interposed between the active member and weight carrying lever, resting at one end in one of the countersinks 16 of the collar 17, and extending with its other end into the countersink 18 of one of the adjustable screws 19 on the weight carrying levers. The weight of the weight carrying levers thus serves to hold the passive member in place and under compression against the active member.

Since it is only the difference in expansion and contraction of the active and passive members which can be utilized for compensating purposes, it has been found that, when the passive member has a co-efficient of expansion about one-half of that of the active member, the length of the passive member should approximate the length of the diameter of the weight or balance wheel, in order to obtain enough compensation. In this instance there are four glass bars, the length of each of which approximates the diameter of the balance wheel, each glass bar carrying one-quarter of the weight.

The pivots 11 may be constructed in any suitable manner, but are preferably made as follows: Each of the arms 10 is provided with a pivot pin 20 at one end 21 formed in the shape of a ball or as a part of a sphere, and at its other end 22 formed substantially cylindrical. Each of the weight carrying levers is provided with a stationary part 23 having an adjustable plate 24, the adjustment being effected by means of the pin and slot connection 25 so as to vary the leverage of the weight carrying lever. The plate 24 is provided with a bearing composed of two portions 26 and 27 one of which is provided with a countersink 28 and the other of which is provided in this instance with a non-cylindrical groove 29. The object of this is to make the pivot member 22 and the groove 29 touch only at two points so that they will accommodate themselves to the position assumed by the ball member 21 in the countersink 28. By this means lateral displacement of the ball will be prevented. Furthermore, when assembling the parts it is only necessary to hang the pivot in its bearings in order to get a perfect joint. No fitting or filing is necessary. $29^a$ indicates adjustable screws or weights on the compensating weight whereby the effective load can be varied.

The block 3 is provided with a pin 30 which when inserted in the hook 31 serves to suspend the balance wheel on the spring. When a variation in temperature occurs the effective torsional length of the spring will vary, thus either lifting or lowering the balance wheel as a whole. The active and passive members will also expand or contract. Assuming that they expand the active member will lengthen say two units and carry the passive member down with it. But the passive member will expand say one unit upwardly from its point of support on the active member. The difference in expansion and contraction is therefore, in this case, one unit. This will cause the weight carrying lever to turn around its pivots and move the weight inwardly sufficiently to compensate for the radial or diametral expansion of the balance wheel and the lengthwise expansion of the spring. A decrease in temperature will produce the opposite result. It will be noted that it is the radial expansion or contraction of the balance wheel which has to be compensated for, and not its lengthwise expansion or contraction. It is also further to be observed that when the passive member contracts the weight of the lever will cause it to follow the passive member thereby always keeping it in place against the active member.

Owing to the construction of the parts they can be readily disengaged when it is desired to repair or adjust them, but in order to prevent the weight carrying lever from moving outwardly too far and thus release the passive member, means are provided for preventing an undue outward movement of the weight carrying lever. In the present instance, this takes the form of a sleeve 32 having the arms 33 provided with hooks 34 and held in position on the post 9 by means of the set screw 35 or otherwise. When it is desired to take the balance wheel apart, this sleeve is released and turned so as to bring the hooks 34 out of the plane of the levers 12.

What is claimed is:

1. In an escapement regulator the combination of a torsional spring suspended vertically, a weight adapted to move between planes at right angles to the plane of the spring, means interposed between the spring and the weight for pivotally moving the weight inwardly under the influence of heat, said means comprising a member of high expansibility expanding in a direction away from the axis of oscillation, a hinged member attached thereto and a member of less expansibility interposed between the high expansion member and the hinged member.

2. In an escapement regulator the combination of a suspension member, a vertically suspended active member of high expansibility attached thereto, a weight and means interposed between the weight and the active member for employing the downwardly expansive force of the said member as the active force to move the weight horizontally in a direction nearer toward the active member.

3. In an escapement regulator the combination of a suspension member, a plurality of equal sectional weights adapted to move between two parallel planes at right angles to the plane of the suspension member, levers pivoted at one end and supporting the sectional weight at the other, an active member having a high degree of expansibility and carrying the pivotal connection of the levers and low expansion members for each sectional weight interposed between the active member and the lever.

4. In an escapement regulator the combination of a suspension member carrying a weight or weights and a connection between said weights and the suspension member consisting of the active member 9, the lever 12, and the passive member 15 substantially as shown and described.

5. In an escapement regulator the combination of a suspension member, an active member having a high degree of expansibility, a weight pivotally connected with the regulator and a passive member of vitreous material removably interposed between the weight carrying lever and the active member, both ends of said passive member being arranged to act as pivots.

6. In an escapement regulator, the combination with one of the members thereof, and a compensating lever, of means connecting the two members, comprising: a bearing countersunk at one point and provided with a groove at another point, and a pivot pin, having a ball at one end adapted to rest in the countersink of the bearing, and adapted with its other end to rest in the groove aforesaid to prevent lateral displacement of the ball in the countersink.

7. In an escapement regulator, the combination with one of the members thereof, and a compensating lever, of means connecting the two members, comprising: a bearing countersunk at one point and provided with a groove at another point, and a pivot pin fitting loosely with one end in the groove and provided with a ball at its other end adapted to rest in the countersink of the bearing.

8. In an escapement regulator, the combination with one of the members thereof, and a compensating lever, of means connecting the two members, comprising: a bearing countersunk at one point and provided with a non-cylindrical groove at another point, and a pivot pin fitting loosely with one end in the groove and provided with a ball at its other end adapted to rest in the countersink of the bearing.

Signed at New York city this 29th day of October, 1907.

FREDERIC ECAUBERT.

Witnesses:
 Geo. A. Marshall,
 Axel V. Beeken.